(12) United States Patent
Prater et al.

(10) Patent No.: US 7,506,394 B2
(45) Date of Patent: Mar. 24, 2009

(54) WRAP-AROUND BRUSH SYSTEM FOR CONVEYOR CAR WASH

(75) Inventors: Curtis S. Prater, Warren, MI (US); Thomas E. Weyandt, Northville, MI (US)

(73) Assignee: Belanger, Inc., Northville, MI (US)

( * ) Notice: Subject to any disclaimer, the term of this patent is extended or adjusted under 35 U.S.C. 154(b) by 530 days.

(21) Appl. No.: 11/096,574

(22) Filed: Apr. 1, 2005

(65) Prior Publication Data
US 2006/0218734 A1 Oct. 5, 2006

(51) Int. Cl.
*B60S 3/06* (2006.01)

(52) U.S. Cl. .................. 15/53.2; 15/53.3; 15/DIG. 2

(58) Field of Classification Search .................. 15/53.2, 15/53.3, DIG. 2, 53.1
See application file for complete search history.

(56) References Cited

U.S. PATENT DOCUMENTS

| | | | |
|---|---|---|---|
| 3,428,983 A | * | 2/1969 | Seakan .................. 15/53.2 |
| 3,840,931 A | | 10/1974 | Bivens |
| 4,359,796 A | | 11/1982 | Holbus et al. |
| 5,325,559 A | | 7/1994 | Belanter et al. |
| 6,135,363 A | | 10/2000 | Titzer |

* cited by examiner

*Primary Examiner*—Shay L Karls
(74) *Attorney, Agent, or Firm*—Young Basile PC

(57) ABSTRACT

A wrap-around car wash structure comprising two staggered, vertical brushes. Each brush is mounted on a carriage which slides along a bifurcated boom pivotally mounted on a support base. The boom and carriages start in an extended position wherein the brushes are near the center of the wash lane; the booms swing in toward the sides of the lane as the brushes' carriages are pulled inwardly by reversible power cylinders. A control mechanism on at least one of the booms promptly reverses the power cylinder as the brush clears the side of the vehicle regardless of the width of the vehicle and the degree to which it has displaced the boom toward the side of the wash lane.

19 Claims, 9 Drawing Sheets

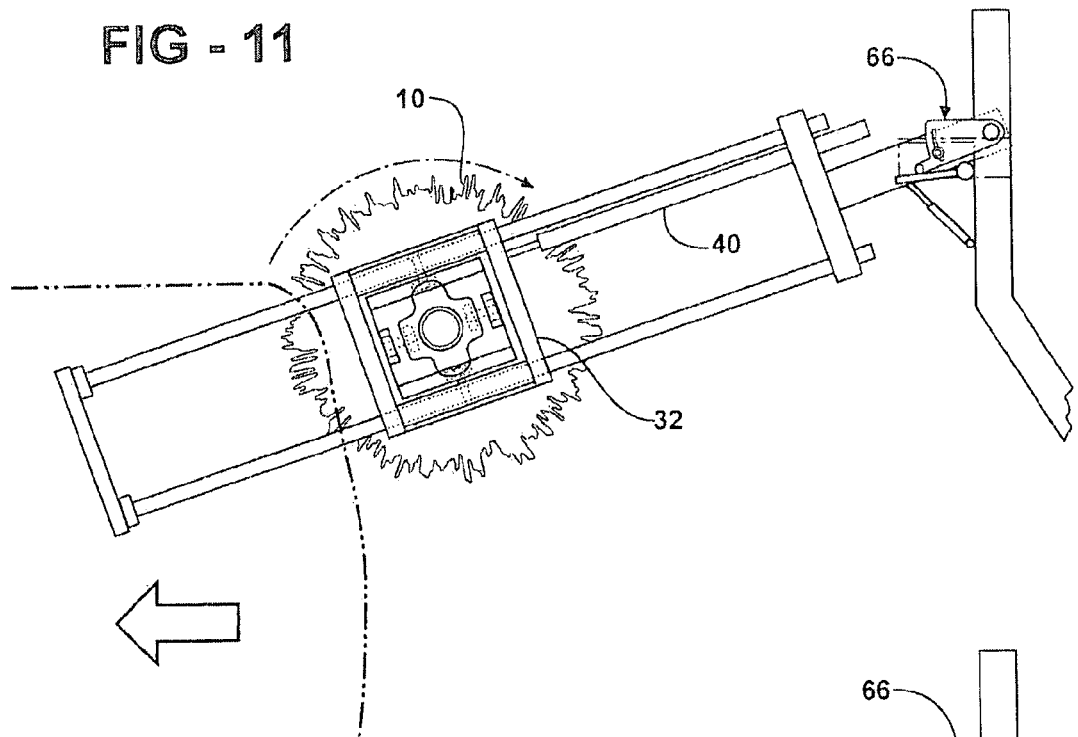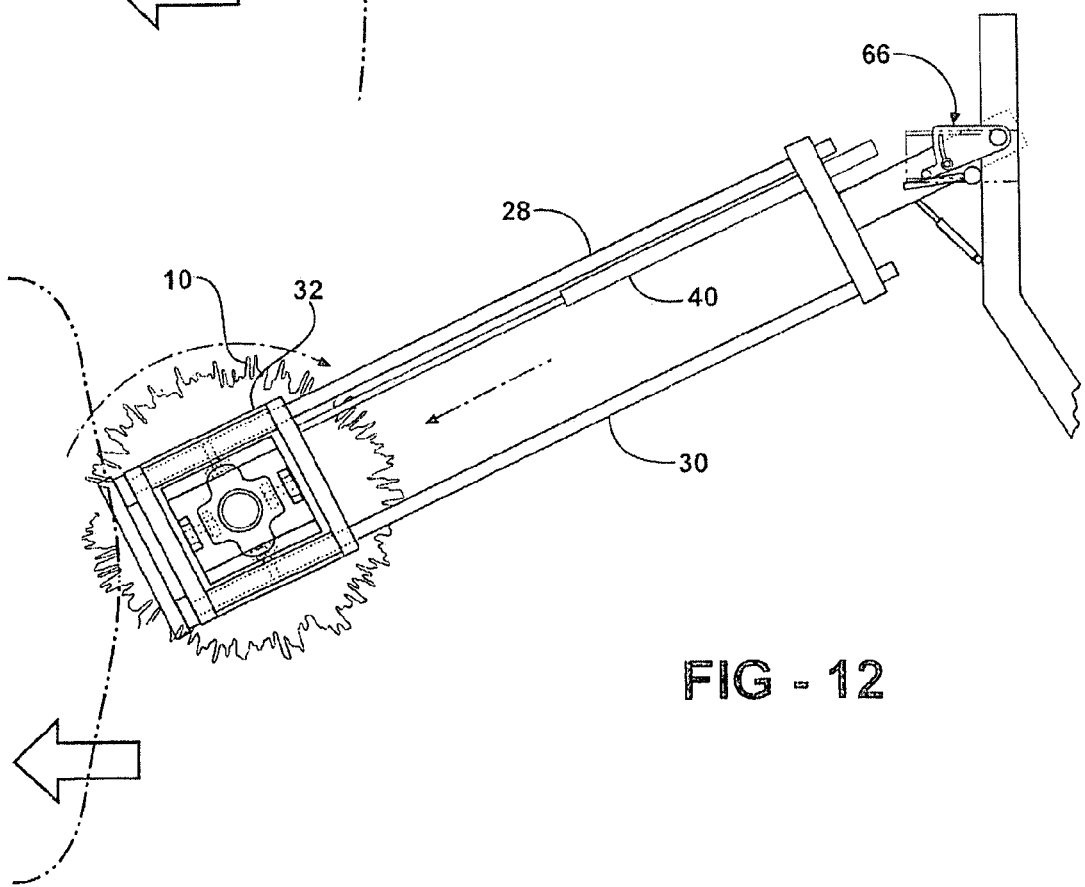

WRAP-AROUND BRUSH SYSTEM FOR CONVEYOR CAR WASH

FIELD OF THE INVENTION

This invention relates to wrap-around brush systems for automatic car washes and more particularly to an improved system which causes the wrap around brushes to closely follow the exterior contours of a vehicle being washed.

BACKGROUND OF THE INVENTION

It is well known to support a pair of car wash brushes having substantially vertical axes of rotation on booms or "knuckles" which can pivot about vertical axes of rotation adjacent to a car wash lane to engage and scrub the front sides and rear surfaces of a vehicle. It is typical to use a power cylinder which urges the brushes to the outermost or extended positions wherein they are closer to the center line of the wash lane and on appropriate command deactivate the cylinders and allow gravity to move the brushes back toward a retracted position on the boom or knuckle while the vehicle is passing between them. If the brushes are to engage and follow the rear surface of the vehicle it is necessary to reactivate the cylinder to urge the brushes toward the extended or outermost positions as soon as the vehicle is far enough forward to clear the brushes and allow them to move back out toward the center of the wash lane. It is particularly problematical to program the initiation of the outward re-extension of the brushes to boom or knuckle angle since vehicles of different width displace at least one of the booms or knuckles to a different extent as they pass between the wrap around brushes.

SUMMARY

According to the first aspect of the invention an improved car wash structure of the swing-out brush type is provided it being understood that the swing-out support structure hereinafter described is typically used in reversely similar pairs which are staggered or offset along the wash lane to prevent interference between brushes with overlapping coverage. The improved support structure is pivotally mounted for angular displacement between a first position in which the associated brush is extended out across the wash lane and a second position in which the brush is near the side of the wash lane. The combination further includes for each brush a reversible power cylinder which both extends and retracts the brush relative to the wash lane centerline, i.e., the system of the present invention does not rely on gravity or brush rotation to move the brush inwardly from the extended position. The apparatus further comprises control apparatus including a valve which toggles the power cylinder between first and second acuation conditions as a function of angular position of the brush support structure.

In the preferred form described in detail herein, the brush support structure is a swinging boom and a carriage which slides out and in along the boom under the control of the reversible power cylinder. The invention can, however, be applied to knuckle-type systems as well.

In accordance with a second aspect of the invention, a control system is provided for toggling a brush extension drive cylinder between outward extension and inward extension conditions of actuation and for triggering the onset of the outwardly extending actuation condition after a pre-determined amount of angular boom deflection toward the extended position irrespective of the width of the vehicle and the degree to which it displaces the brush support structure to the side of the wash lane. In brief, the outward extension of the brush is triggered for narrow vehicles as quickly as it is triggered for wider vehicles, even though wider vehicles push the brush support farther away from the wash lane centerline. In general, this is accomplished through the use of a control device having a lost-motion connection to the brush support broom or knuckle, and a limit switch which is triggered by the control device.

The invention will be described with respect to a preferred and specific embodiment thereof in the form of a two-brush wrap-around system in which two booms are mounted in staggered or offset conditions over a wash lane by means of a z-shaped overhead beam. The system contemplates the use of a car wash conveyor which traps the tires on the left side of the vehicle only. This gives rise to a variable condition on the right side of the vehicle as far as distance between the side surface of the vehicle and the location of the pivot axis of the boom is concerned; i.e., for narrower vehicles that distance is greater while for wider vehicles that distance is less. The control system of the present invention may, therefore, have fixed programming on the left side and variable programming as described above on the right side only. Alternatively, it is also possible but not necessary to construct the control systems on the right and left sides to be identical.

In the preferred form hereinafter described in detail, the boom is bifurcated and consists of two parallel, but spaced apart box-type aluminum beams. A carriage is mounted on the two spaced apart parallel beams for sliding movement there along over a distance of approximately 38 inches. This distance is given for purposes of illustration only and is representative of a system for washing conventional passenger cars. That movement is controlled by a power cylinder which acts in both directions, i.e., pushes the brush carriage out when in one actuation condition and pulls the brush carriage back in when in another actuation condition. The carriage supports a motor and a vertically depending brush axle between the two parallel beams. In the preferred form a gimbal system provides a universal joint which allows a degree of swing in the brush axle as it engages a vehicle. This provides both operating advantage and damage control.

In the preferred form, the control system comprises a valve which is toggled by a solenoid to place the power cylinder in one of the other of the two actuation conditions. The control system further comprises a limit switch having a toggle wand and a trigger mechanism comprising a plate and a pin which is mounted for limited angular movement with the boom over only a portion of its total angular displacement range, i.e., a lost-motion connection. The pin thus toggles the limit switch wand back and forth and triggers the onset of the brush carriage extension promptly after the boom begins to move back toward the extended position regardless of the extent to which the vehicle displaces the boom It will be noted that the boom does not move from stop to stop regardless of vehicle width. Instead, it moves from a stop to a "floating" position which varies according to vehicle width. Yet the extension trigger point always occurs after a fixed degree of boom movement after clearing the side of the vehicle.

The invention and its various features and advantages may be best understood from a reading of the following specification which describes an actual embodiment thereof in detail. This description is to be taken With the accompanying drawings.

Other applications of the present invention Ill become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIGS. 7-12 are plan views of one of the two brushes in the installation of FIG. 1 showing the sequence of operational positions thereof during the washing of a typical vehicle.

DETAILED DESCRIPTION OF THE ILLUSTRATIVE EMBODIMENT

Figure 1:
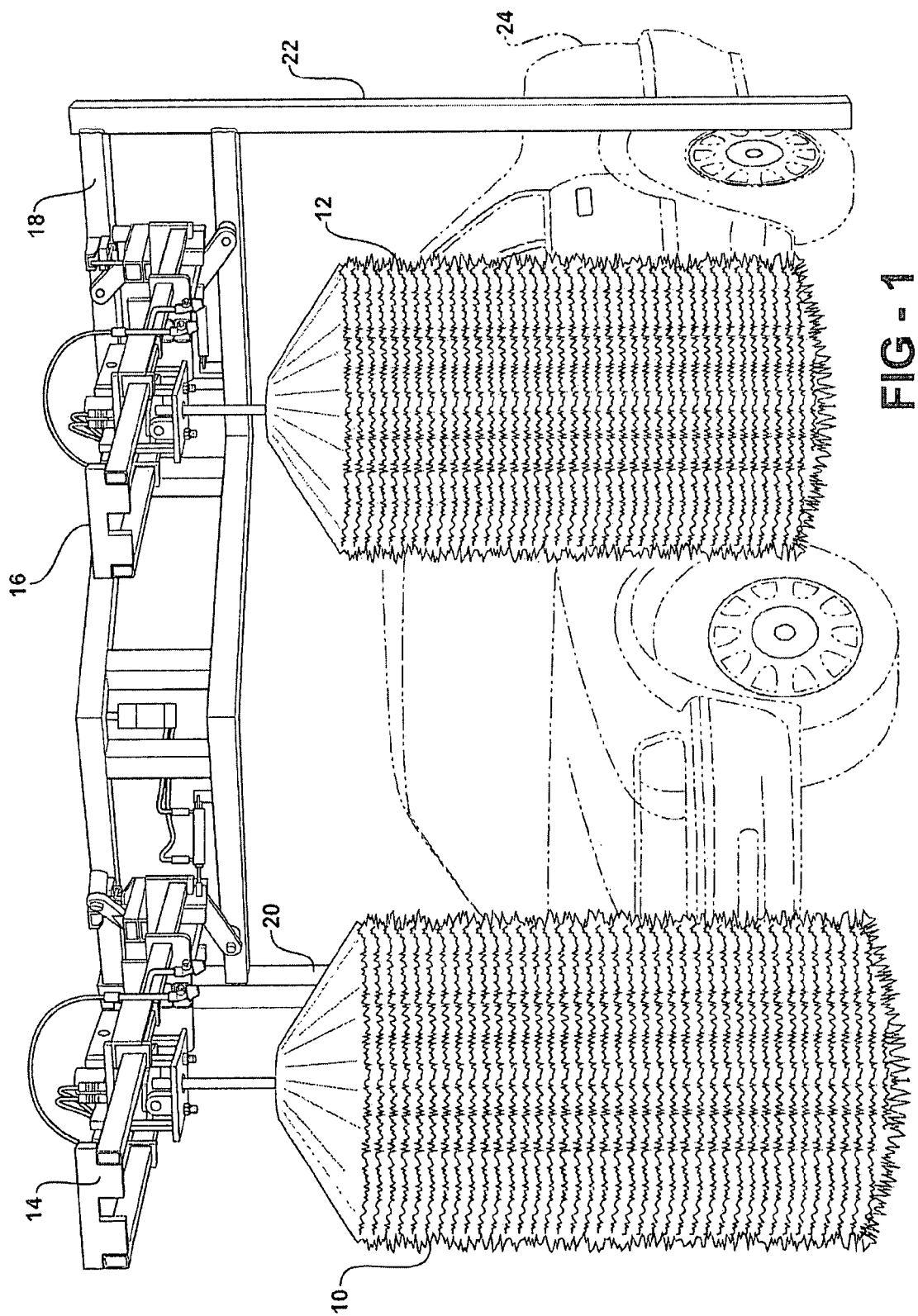
FIG. 1 is a perspective view of a rap-around car wash brush structure including two staggered vertical brushes and an overhead support structure for the brushes.

Referring to FIG. 1 there is shown a wrap-around brush-type car wash system comprising vertically oriented rotatable brushes 10 and 12 having respective brush support structures 14 and 16 pivotally connected to a z-shaped overhead support beam structure 18 mounted on vertical posts 20 and 22 on opposite sides of a car wash lane through which a passenger vehicle 24 shown in phantom lines is being moved by means of a conventional conveyor (not shown). As hereinafter described in detail, the brush support structures 14 and 16 comprise swinging booms carrying slidable brush support carriages power cylinders for extending and retracting the carriages and control systems for programming the extension and retraction movements all as hereinafter described with reference to FIGS. 2-6.

Turning now to FIGS. 2-6 it will be understood that the illustrative embodiment of the invention is being described with respect to the brush 10 which is mounted to contact the right side of the vehicle 24 as it progresses along the wash lane. This qualification is given because it is the right side of the vehicle 24 which will vary in position relative to the right side vertical post 20 according to the overall width of the vehicle; i.e., the conveyor guide structure is typically mounted on the left side of the wash lane where it is most easily entered by the driver of an automobile having a left side steering station. The left side of the vehicle is therefore more or less fixed relative to the left side vertical post 22. It is the variable width of vehicles and the varying position of the right side of the vehicle relative to the car wash structure which gives rise to the need for the control system hereinafter described in detail.

Figure 2:
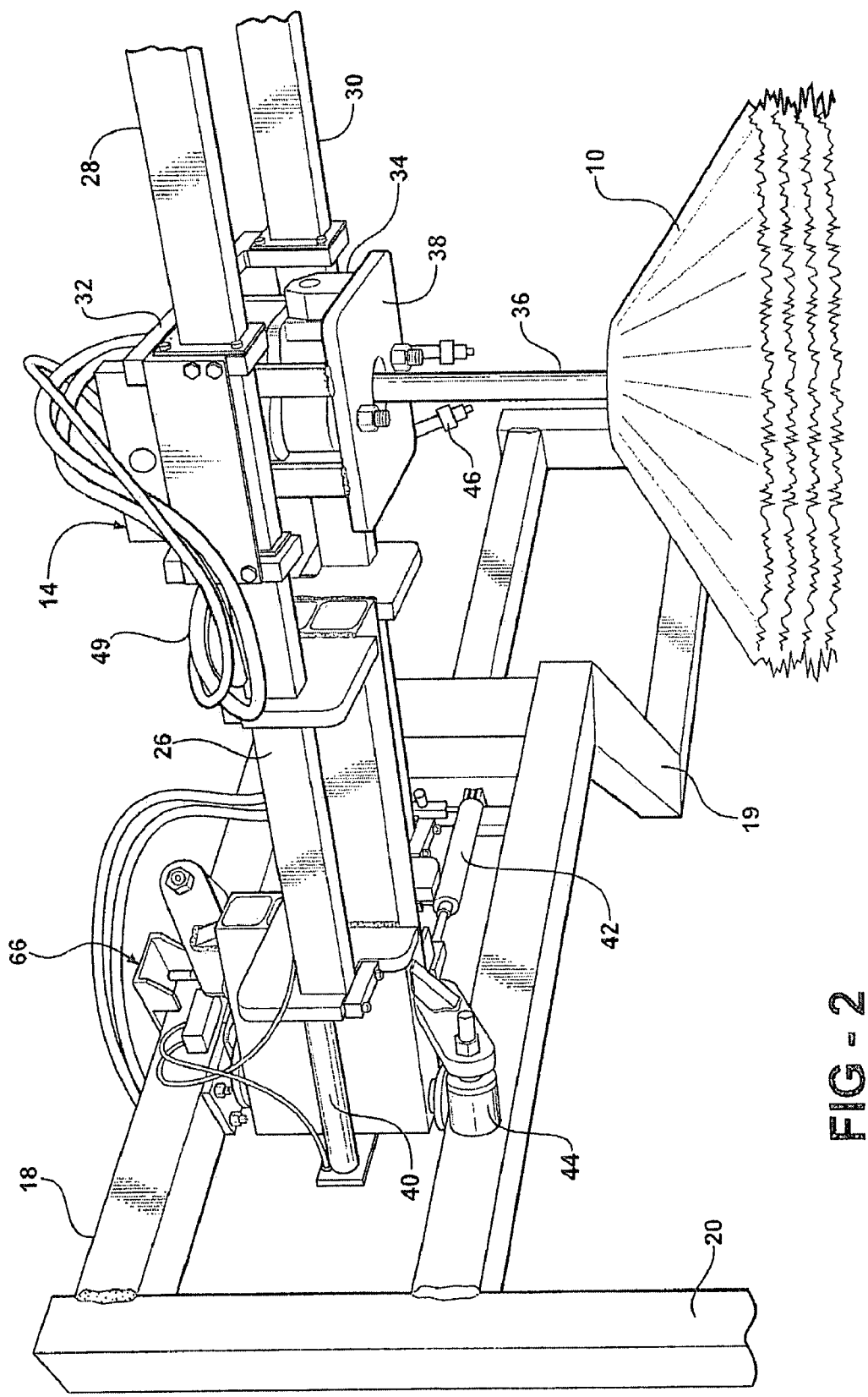
FIG. 2 is a perspective view of one of the two brush support systems in the installation of FIG. 1.

Looking to FIG. 2, the support structure for the brush 10 is shown to comprise a swinging boom having a vertical pivot axis which lies just inside of the right side vertical post 20 and extends proximately through the z-shaped horizontal beams 18 and 19. The outward half of the boom 26 is bifurcated into parallel spaced apart arms 28 and 30 and is typically made of welded aluminum or other non-corrosive material. The boom 26 supports a carriage 32 having slide bearings of a synthetic material such as Nylon which does not require lubrication. The carriage supports an hydraulic motor for rotating the axle 36 of the brush 10 and a gimbal system 34 which permits the axle to swing approximately ten degrees in all directions relative to a base plate 38 through which the axle 36 extends. A reversible power cylinder 40 is mounted between the end of the booms 26 closest to the pivot axis and the carriage 32 to extend and retract the carriage according to the direction in which the power cylinder 40 is activated. A cylinder 42 urges the boom 26 outwardly to extend across the wash lane into the position shown in FIG. 1. However, the cylinder 42 yields to brush pressure to permit the boom to swing back in toward a position in which it becomes approximately parallel to the direction of motion of the vehicle 24. Large rubber bumper-type stops 44 are to provide cushioned limits of movement of the boom 26. A control system 66 hereinafter described toggles the activation of the power cylinder 40 between the two conditions of operation. Nozzles 46 and 47 along with supplied hoses 49 are provided to conduct water and chemicals to the area of the brush 10.

Figure 3:
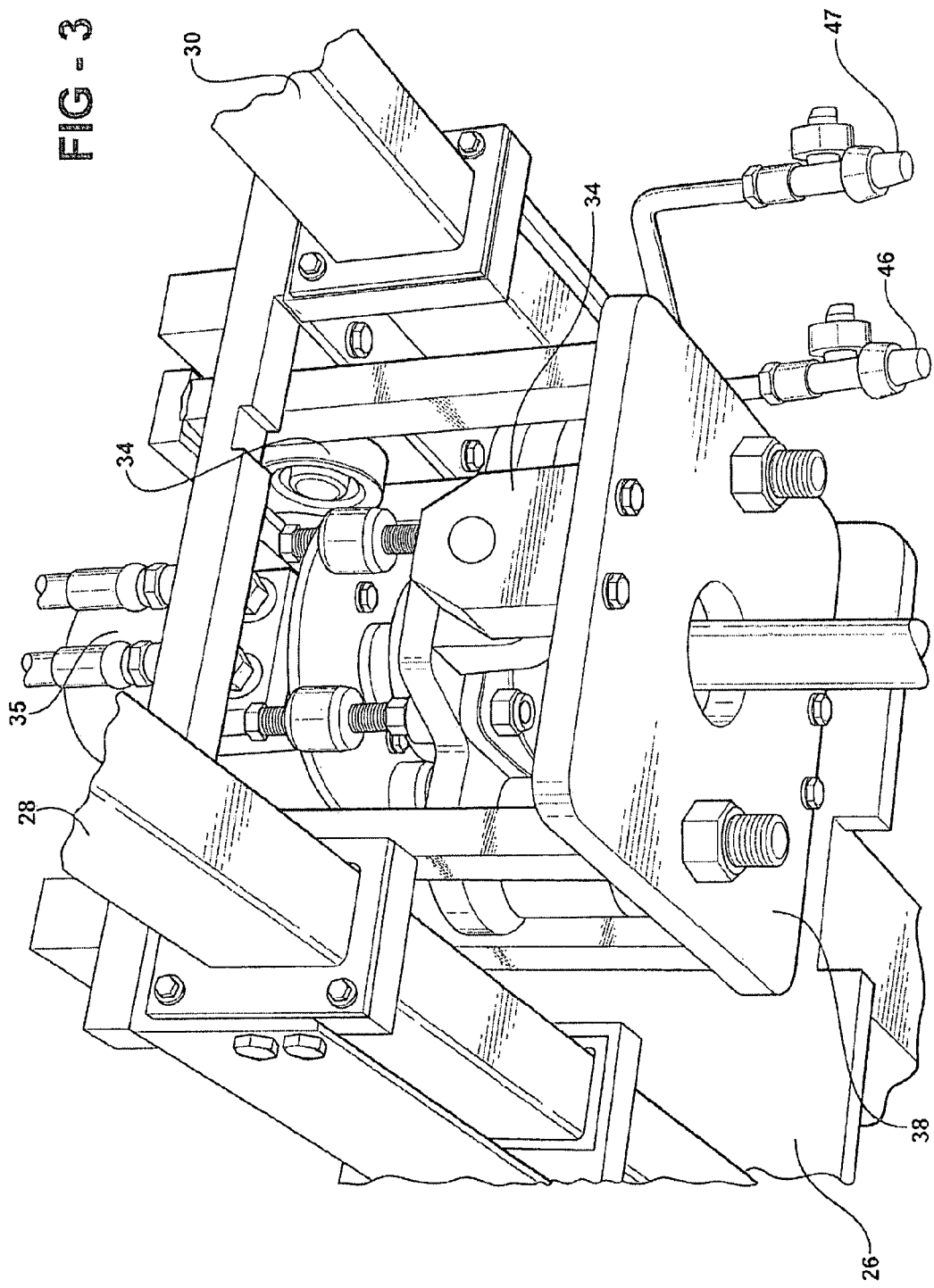
FIG. 3 is a perspective view of a portion of the apparatus shown in FIG. 2.

FIG. 3 shows the two-axis brush gimbal structure 34 and the brush motor 35 mounted thereover. The brush power structure as well as the gimbal structure 34 lies between the arms 28 and 30 of the bifurcated boom 26.

Figure 4:
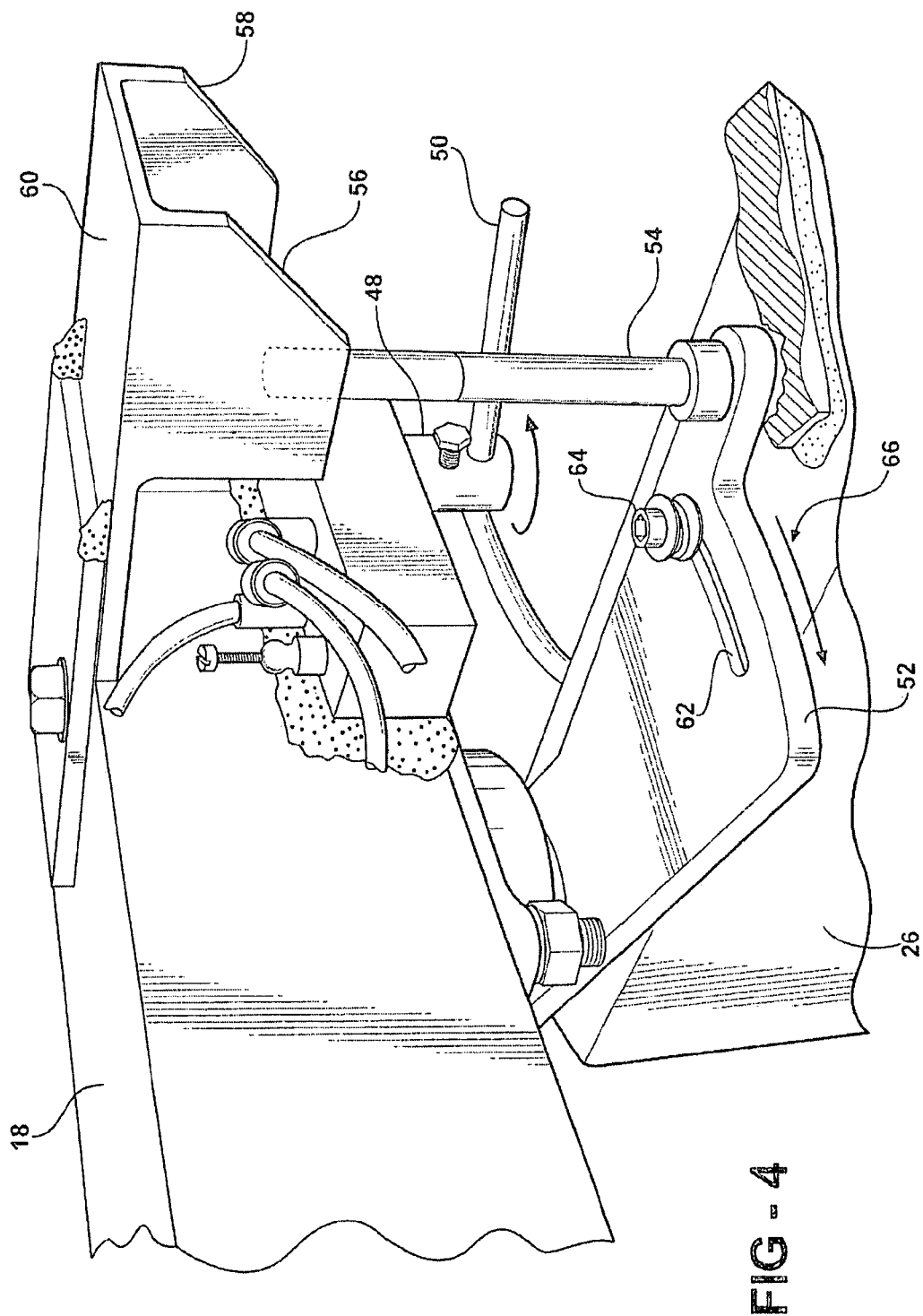
FIG. 4 is a perspective drawing of details of a control system for extending and retracting the brush in the apparatus of FIGS. 1 and 2 in a first position.
Figure 5:
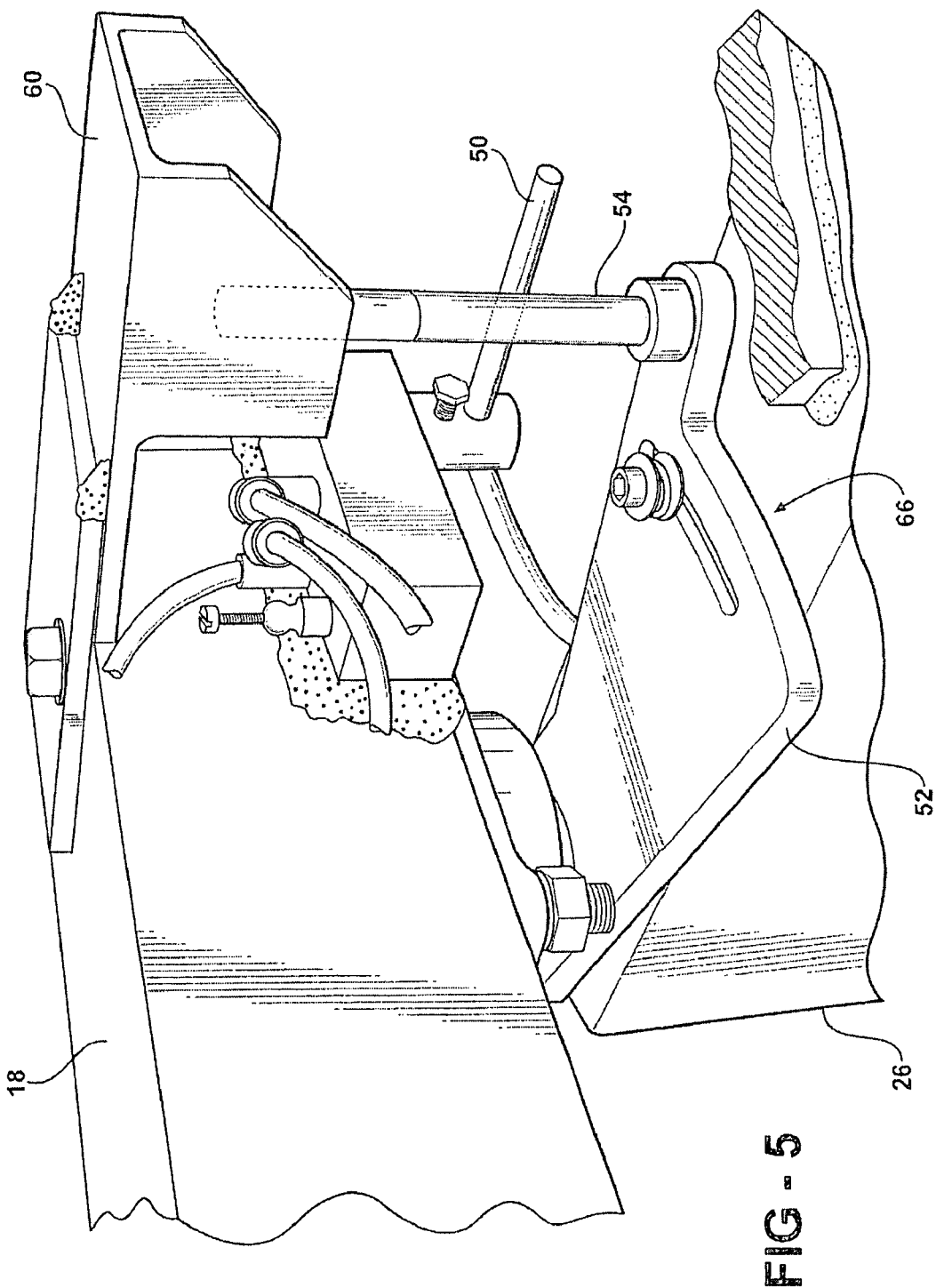
FIG. 5 shows the apparatus at FIG. 4 in a second position.
Figure 6:
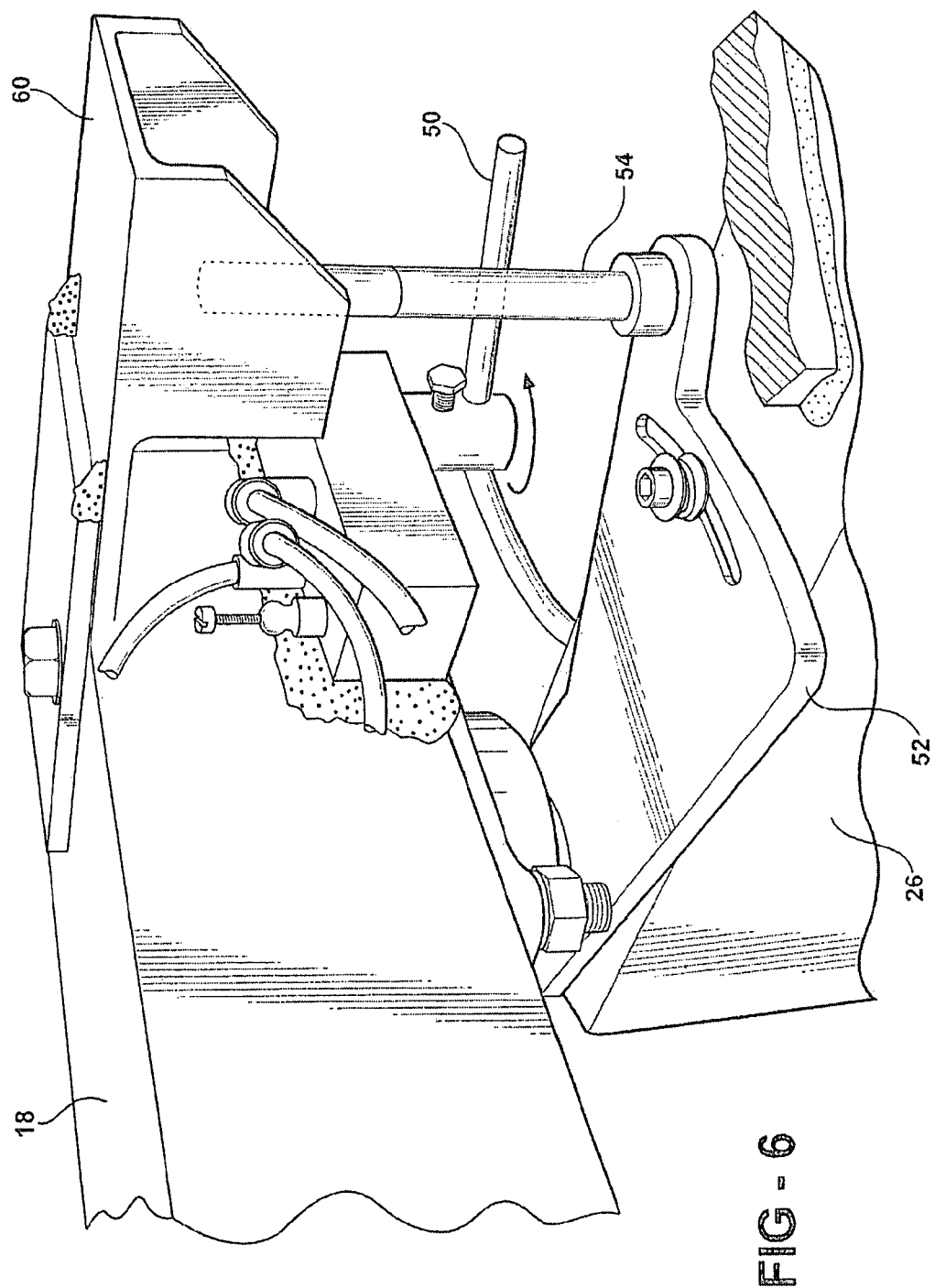
FIG. 6 shows the apparatus at FIGS. 4 and 5 in a third position.

Referring now to FIGS. 4, 5 and 6 the control system 66 for toggling the direction of activation and the power cylinder 40 is shown in three positions of operation. The control system comprises a limit switch 48 mounted on the support base beam 18 and having a wand 50 which extends therefrom. The limit switch 48 and wand 50 control a solenoid valve which controls the application of pressurized fluid to one or the other end of the power cylinder 40. The limit switch 48 is conventional and includes a spring which biases the limit switch to the condition which causes the power cylinder 40 to retract the carriage 32 to the inward position. When the wand 50 is undeflected, the power cylinder is reversed to pull the carriage in toward the center of the boom 28, 30. In this system, the deflected or unrest position of the limit switch 48 and wand 50 is such as to activate the power cylinder 40 to extend the carriage 32 and the brush 10 to the far outer position along the boom 28, 30.

Continuing with the description of the control system 66, a metal plate 52 is mounted for pivotal movement with the boom 26 about the vertical axis of rotation thereof. The plate 52 carries an upstanding trigger pin 54 which can contact the wand 50 at right angles to displace the wand away from the rest position and toggle the activated condition of the power cylinder 60 to pull the brush 10 and carriage 32 along the boom 28, 30 to the outward position. The plate 52 has an arcuate slot 62 formed therein which provides clearance for an upstanding bolt attached to the boom 26. The top end of the bolt receives some spring washers and a nut 64 to provide a "lost-motion" connection between the plate 52 and the boom 26.

The final component of the control system is a hood-shaped component 60 attached to the beam 18 and having spaced apart side plates 56 and 58 which straddle and trap the top of the trigger pin 54 as hereinafter explained.

FIG. 4 shows the trigger pin 54 and the limit switch 48 in the unrest or deflected position with the boom 26 fully extended across the wash lane and the power cylinder 40 activated to push the brush 10 to the far outer end of the boom.

FIG. 5 shows the position of the control structure 66 as the boom 26 begins to move back toward a position in which it is more parallel to the direction of travel of the vehicle 24. The plate 52 moves with the boom over the initial travel of the boom 26 thus bringing the pin 54 out of contact with the wand 50.

Going on to FIG. 6 the plate 52 continues to move with the boom 26 until the trigger pin 54 engages the side plate 56 of the hood 60 at which time the plate 52 can no longer move with the boom 26. The limit switch wand remains undeflected to toggle the power cylinder 40 to the retracted position. It is noted, however, that as soon as the boom 26 begins to move back toward the extended position, the pin 54 deflects the wand 50 of the limit switch 48 irrespective of the extent to which the boom has moved toward the position in which it is parallel or nearly parallel to the wash lane in the direction of travel of the vehicle. Accordingly, the power cylinder 40 is toggled to re-extend the brush carriage as soon as the brush 10 clears the right corner of the vehicle 24 as hereinafter described with reference to FIGS. 7-12.

Referring now to FIGS. 7-12, the full operation of the right side brush in the system of FIG. 1 is described in detail.

Figure 7:
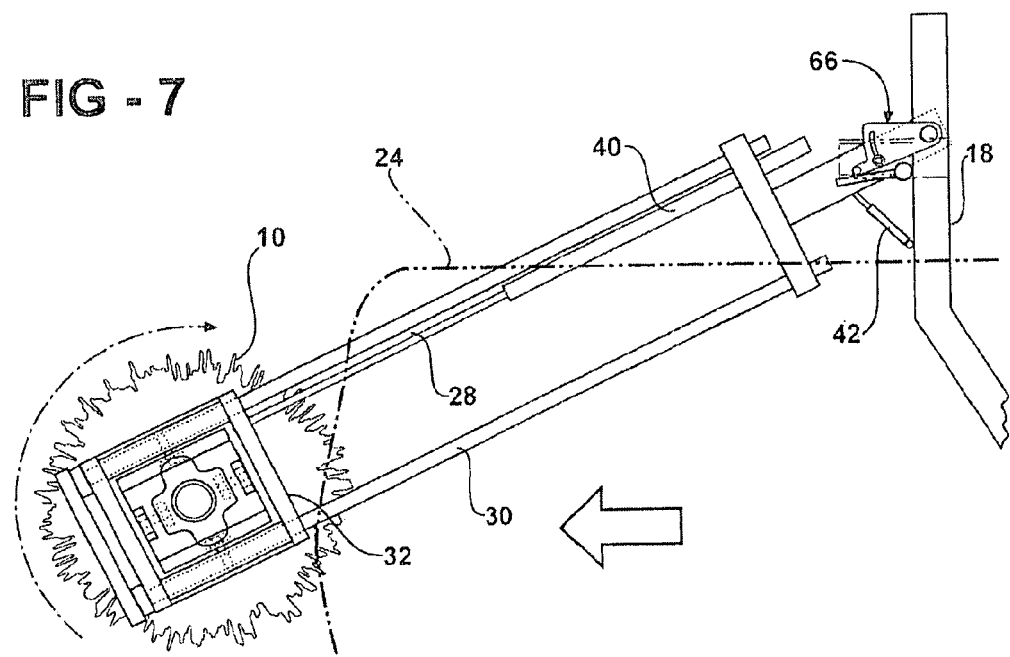
Figure 8:
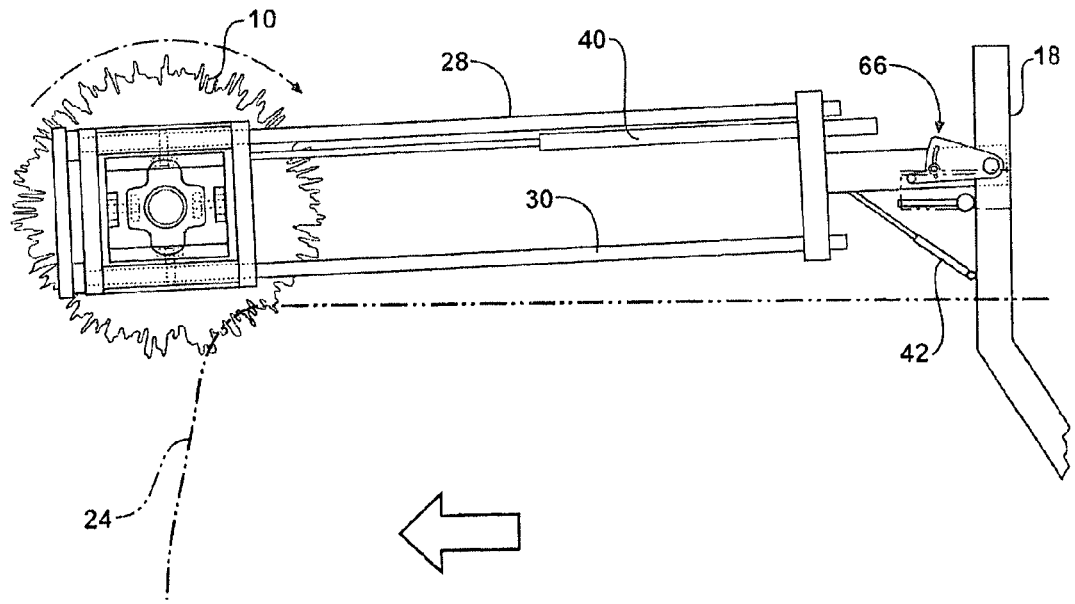
Figure 9:
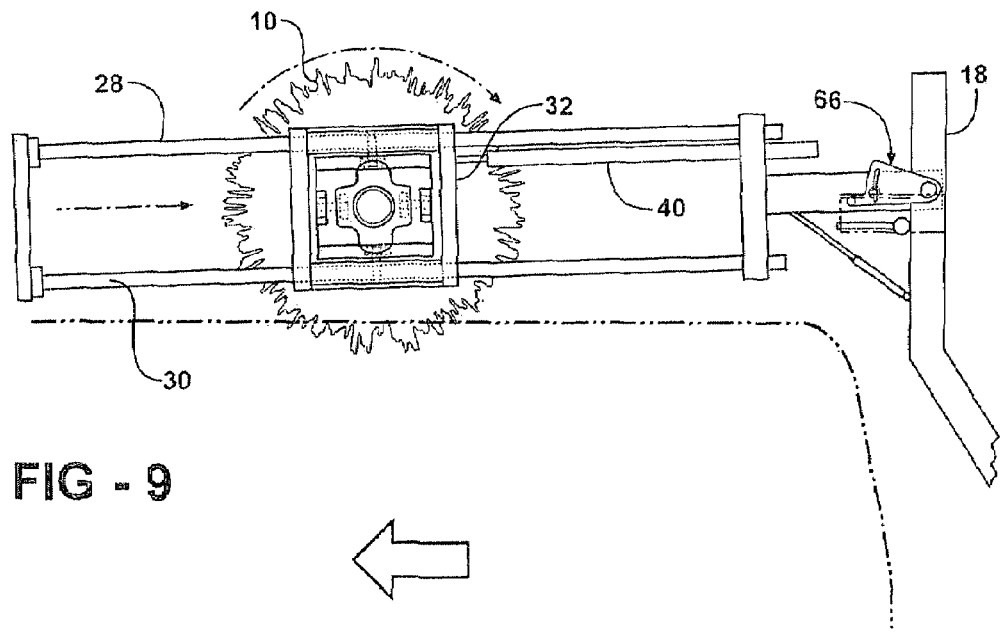

Starting with FIG. 7, the boom 28, 30 is fully extended out across the wash lane and the power cylinder 40 is operated by the control system 66 to fully extend the brush 10 and the carriage 32 to the far end of the boom 28, 30. The rotation of the brush 10 is such as to cause the boom 28, 30 to move in a clockwise position; i.e., toward a more parallel position as shown in FIG. 8. Thus, as shown in FIG. 8, the brush 10 engages and washes the entire right front side of the vehicle 24 and is poised in FIG. 8 to begin its travel along the right side of the vehicle 24 as shown in FIG. 9. It is the movement of the boom 28, 30 to the parallel position shown in FIG. 8 that toggles the power cylinder 40 by way of the control system 66 to begin to retract the carriage 32 toward the base beam 18 near the pivot axis of the boom 28, 30.

Figure 10:
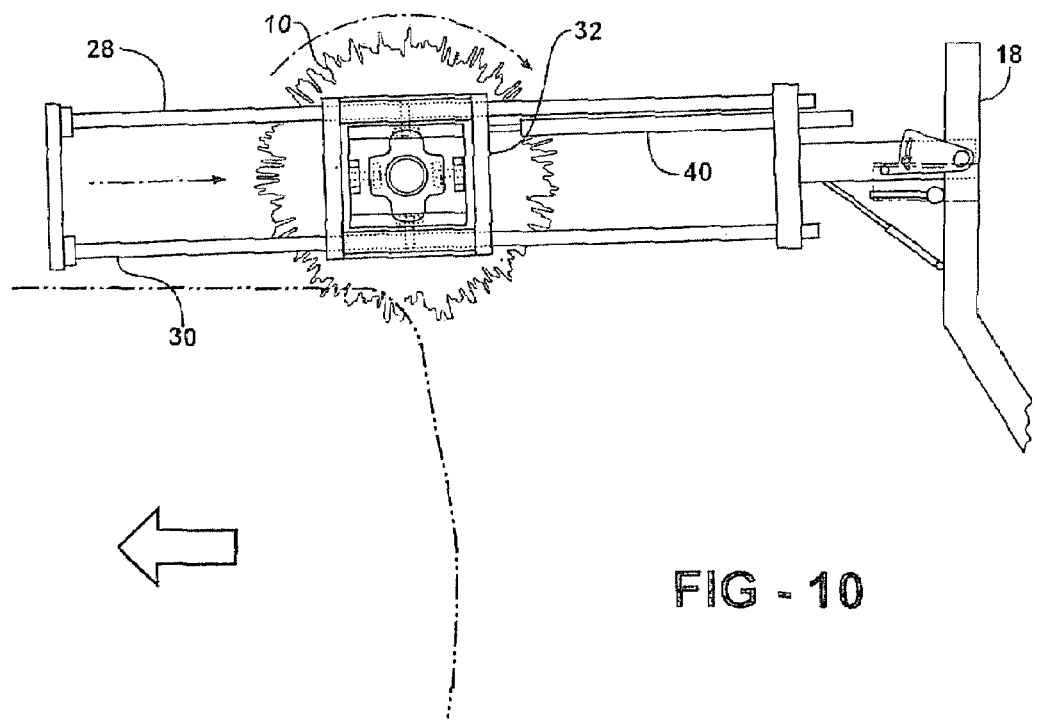

As shown in FIG. 10, the brush 10 ultimately reaches the right rear corner of the vehicle 24 at which time the brush 10 moves around to the rear surface of the vehicle as shown in FIG. 11. At this point, the boom 28, 30 is urged by the bias cylinder 42 back toward the extended position across the wash lane and the initial angular movement of the boom 28, 30 back toward the extended position operates through the control system 66 previously described with reference to FIGS. 4-6 to toggle the power cylinder 40 and re-extend the brush 10 and the brush support carriage 32. The early initiation of this extension movement ensures that the brush 10 remains in contact with the rear surface of the vehicle 24 as it rounds the right rear corner of the vehicle. The boom 28, 30 typically never hits a limit stop in the parallel position; rather, it simply "floats" as the brush 10 moves along the side of the car 24. The limit switch 48 remains undeflected in the floating position but becomes deflected as soon as the boom begins its outward movement.

It is to be understood that the structure on the left side of the vehicle may be the mirror image of the structure described above with reference to FIGS. 2-12. However the left side structure for the reasons explained above, does not require a lost-motion control plate for the reason that the left side of the vehicle always moves or displaces the associated brush boom toward the parallel position to the same extent regardless of the width of the vehicle. There is no reason, however, why substantially identical systems cannot be used on both sides of the vehicle if the installer and/or owner/operator so prefers.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A car wash structure comprising:
  a. a support base fixed relative to a car wash lane;
  b. a brush support arm for carrying a brush said arm being pivotally mounted on the support base for angular displacement about a vertical axis;
  c. a brush mounted on the arm for movement along the arm between an extended position and a retracted position;
  d. a power cylinder having a powered first actuation condition in which it forcibly drives the brush along the arm toward the extended position and a second powered actuation condition in which it forcibly drives the brush along the arm toward the retracted position; and
  e. a control system for toggling the power cylinder between the first and second actuation conditions as a function of angular displacement of the brush support relative to the support base.

2. A car wash structure as defined in claim 1 further including a bias cylinder mounted between the brush support arm and the support base to urge the brush support arm toward the center of a wash lane.

3. A car wash structure as defined in claim 1 wherein said control structure further includes a limit switch having first and second electrical conditions and a control wand extending therefrom to toggle the limit switch between the first and second electrical conditions.

4. A car wash structure as defined in claim 1 wherein the brush support arm comprises a boom, said structure further comprising a carriage mounted for displacement along the boom; said power cylinder being connected between the boom and carriage.

5. A car wash structure as defined in claim 4 further including a plate pivotally mounted on the fixed support base and pivotally connected to the boom by a lost-motion connection for independent angular displacement of the plate relative to the boom over a range of travel which is less than the total range of angular displacement of the boom, and a trigger-pin extending from the plate for controlled engagement with the limit switch wand.

6. A car wash structure as defined in claim 5 wherein the connection of the plate to the boom is a lost-motion connection comprising a radial slot defined by the plate, the trigger pin passing through the radial slot, and a pressure member connected, to the trigger pin on an opposite side of the plate to apply an axial pressure on the plate toward the boom while allowing forced angular movement of the boom relative to the plate.

7. The car wash structure of claim 6 further comprising a hood member having first and second side members defining a channel for receipt of a free end of the trigger pin in the channel, the first and second side members limiting angular movement of the plate while permitting further angular movement of the boom relative to the plate.

8. The car wash structure of claim 7 wherein the control system allows for reengagement of the limit switch by the trigger pin regardless of the further angular movement of the boom beyond the limited angular movement of the plate in a direction toward a fully deflected position of the boom.

9. A car wash structure as defined in claim 4 further including a universal joint connecting a brush axle to the carriage.

10. A car wash structure as defined in claim 4 wherein a brush axle extends downwardly from a position between the parallel beams.

11. A car wash structure defined in claim 1 further including resilient stops for limiting angular travel of said brush support relative to the support base.

12. A control system for triggering actuation of a car wash function in response to a pre-determined degree of angular movement of a pivotally mounted brush support boom from a variable position of full deflection relative to a fixed support structure comprising:

a. a limit switch with an actuator wand mounted on the fixed support structure;

b. a trigger mechanism mounted for pivot movement with the pivotal boom and for independent movement relative to the pivotal boom about a common pivot axis, the trigger mechanism being arranged to contact the limit switch wand when the pivotally mounted brush support boom moves toward an extended position; and c. a reset structure mounted on the fixed support structure for bi-directionally limiting the degree of angular travel of the trigger mechanism to less than the full allowable angular deflection of the pivotally mounted boom, thereby to maintain a fixed degree of angular displacement or difference between the trigger and the limit switch wand needed to bring the trigger into contact with the wand irrespective of the degree of total deflection of the pivotal boom away from the extended position.

13. A trigger mechanism for use in combination with a car wash structure of the type including a pivotally mounted boom which is moveable between an extended position and a fully deflected position relative to a fixed support structure comprising:

a. A trigger plate pivotally mounted to the fixed structure and pivotally connected to the boom for limited independent angular movement of the plate relative to the boom by a lost-motion connection;

b. a limit switch mounted on the fixed structure and having an actuator extending into a position where it is contacted by the trigger plate or a rod extending upwardly from the trigger plate when the boom and plate move from a deflected position toward the extended position; and c. means for limiting the degree of angular travel of the trigger plate relative to the boom such that when the boom moves toward the deflected position and releases, the limit switch actuator, the degree of movement of the boom and trigger plate in the opposite direction; i.e., toward the extended position, needed to bring the trigger rod back into contact with the limit switch actuator is the same regardless of the extent to which the boom moves in the direction toward the deflected position beyond the limit imposed on the trigger rod.

14. A method of operating a car wash system of the type including a brush support boom which pivots about a vertical axis adjacent a wash lane, a brush carriage which carries a brush and travels over the boom between an extended position proximate the free end of the boom and a retracted position proximate the pivot end of the boom, and a reversible power source which can be set in a first condition to drive the carriage along the boom in one direction and a second condition to drive the carriage along then boom in the opposite direction, comprising the steps of:

a. pivoting the boom to a position extending across the wash lane and setting the power source in the first condition to forcibly drive the brush carriage along the boom to the extended position to engage the brush with the front surface of a vehicle moving along the wash lane; and, thereafter, b. pivoting the boom toward a position paralleling the wash lane and setting the power source in the second condition to forcibly drive the brush carriage along the boom toward the retracted position to engage the brush with a side surface of the vehicle.

15. The method described in claim 14 further comprising the step of pivoting the boom back toward a position extending across the wash lane and resetting the power source to the first condition to forcibly drive the brush carriage back toward the extended position to engage the brush against the rear surface of the vehicle.

16. The method of operating a car wash system in claim 15 wherein the system is of the type having a control system with a limit switch connected to set and reset the power source, the method further comprising the step of:

operating the control system so as to deactivate the forcible driving of the brush carriage toward the extended position when the boom reaches a predetermined angular position, wherein the predetermined angular position is selected such that on the initial angular movement of the boom in the direction back toward the extended position across the wash lane the limit switch is toggled to reinitiate the forcible driving of the carriage back toward the extended position regardless of the length of the angular travel of the boom toward the parallel position beyond the predetermined angular position.

17. An improved car washing apparatus having a support structure fixed with respect to a wash lane, a pair of opposing booms pivotally attached at a pivot axis to the support structure for angular movement between an extended position across the wash lane and a retracted position substantially parallel to the direction of movement of the wash lane, a carriage moveable along the respective boom from a free end to adjacent the pivot attachment of the boom to the support structure, a power cylinder for moving the carriage toward the free end of the respective boom, a brush attached to the respective carriage, a bias cylinder attached to the support structure and the respective boom for angular displacement of the boom between the extended position and the retracted position, and a control device having a limit switch for actuating the respective power cylinder to extend the carriage toward the free end of the boom based on the angular position of the respective boom, the car washing apparatus control device improvement comprising:

a trigger plate pivotally mounted to the respective boom pivot axis on the support structure and pivotally attached to the boom for independent angular movement of the plate about the pivot axis with respect to the support structure over an angular distance less than the angular travel of the boom between the extended position and the retracted position, the trigger plate operable to toggle the limit switch to initiate movement of the respective carriage from the position adjacent the boom pivot axis toward the free end of the boom substantially the moment that the boom begins angular travel from the retracted position back toward the extended position.

18. The car washing apparatus of claim 17 wherein the control device further comprises:

a trigger pin mounted to the trigger plate and extending outwardly therefrom;

a fastener connected to the boom and extending outward from the boom;

the trigger plate further defining a closed radial slot for receipt of the boom fastener through the slot, the slot providing for limited angular movement of the plate with respect to the boom; and a channel member fixedly mounted to the support structure including a first side plate and a second side plate defining a channel positioned laterally across the wash lane for receipt of the free end of the trigger pin, the first and the second side plates providing the limited angular movement of the trigger plate with respect to the support structure to less angular movement than the boom between the boom extended position and the retracted position.

19. The car washing apparatus of claim 18 wherein the limit switch is positioned between the first and second side plates such that regardless of the angular position of the boom toward the retracted position beyond the limited angular movement of the plate on initial angular movement of boom back toward the boom extended position the trigger pin contacts the limit switch initiating movement of the brush carriage back toward the free end of the boom.

* * * * *